United States Patent [19]
Minow
[11] 3,935,356
[45] Jan. 27, 1976

[54] FANCIFUL OBJECT

[76] Inventor: Irene M. Minow, Box 325, Cripple Creek, Colo. 80813

[22] Filed: May 29, 1973

[21] Appl. No.: 364,713

[52] U.S. Cl. ...................... 428/163; 47/41; 428/35; 428/167; 428/173
[51] Int. Cl.$^2$ ............................................ B32B 3/30
[58] Field of Search ............ 161/38, 116, 117, 121, 161/123, 7, 88, 139; 47/41; 428/35, 36, 68, 156, 161, 162, 163, 167, 172, 173, 188, 189, 190; 264/257, 258

[56] References Cited

UNITED STATES PATENTS

| | | | |
|---|---|---|---|
| 3,008,256 | 11/1961 | Rice | 161/123 X |
| 3,022,207 | 2/1962 | Lang | 161/121 X |
| 3,363,956 | 1/1968 | Vingren et al. | 161/123 X |

*Primary Examiner*—Thomas J. Herbert, Jr.
*Assistant Examiner*—Bruce H. Hess
*Attorney, Agent, or Firm*—Fraser and Bogucki

[57] ABSTRACT

A decorative object comprises a hollow base of relatively hard, moldable material such as ceramic assuming the shape of the object and having a plurality of molded grooves in the outer surface thereof in selected regions. Selected areas of the base as defined by the grooves are covered with an adhered flexible material such as cloth panels whose margins are superimposed upon at least a portion of the grooves. The panel margins are pressed into the grooves with or without superimposed beading. The combination of various panels, imbedded joinders between the panels and firm adherence creates a pleasing aesthetic effect and the impression that the surface is not covered but that the product is actually fabricated of the cloth material. Surface areas of the base not covered with cloth are colored using appropriate ceramic dyes. Methods of making a decorative object in accordance with the invention comprise forming the base with grooves therein, cutting pieces of cloth the approximate size of the surface areas of the base to be covered by the cloth using a pattern, securing the pieces of cloth to the selected areas of the base using a bonding agent, trimming the edges of the cloth as necessary so that the edges do not extend beyond the grooves, pressing the edges of the cloth back into the grooves and securing beading within the grooves, where desired.

4 Claims, 8 Drawing Figures

FIG. — 2
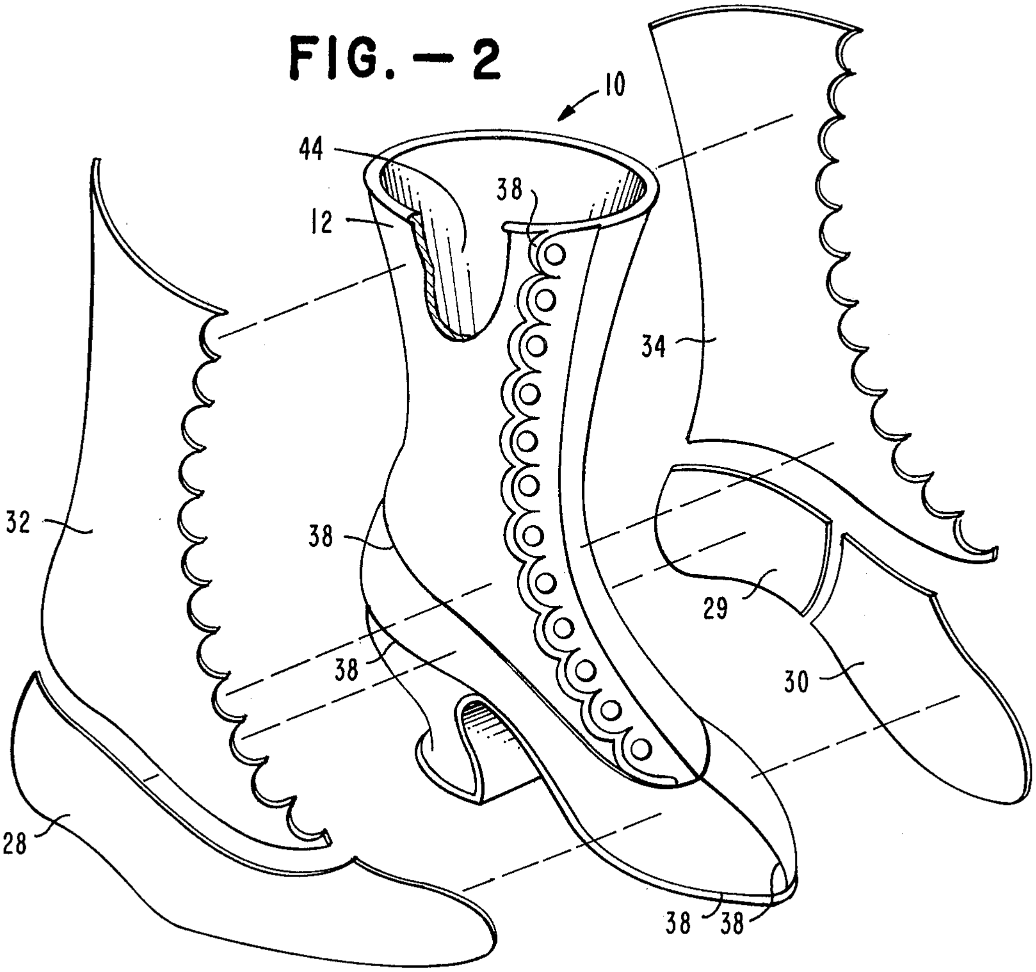
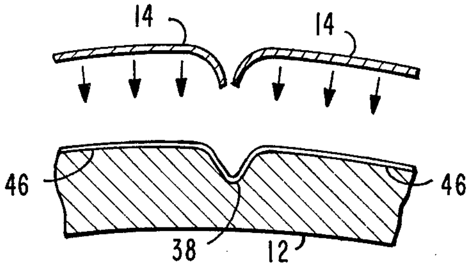
FIG. — 4
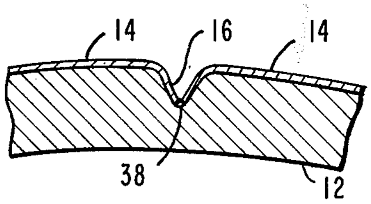
FIG. — 5
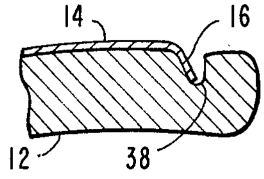
FIG. — 6
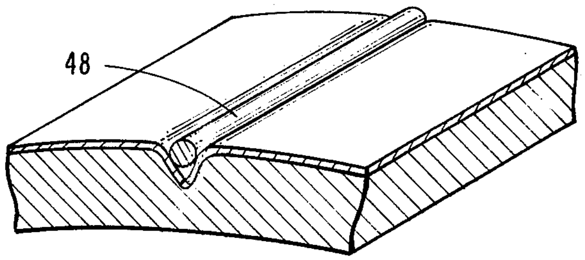
FIG. — 8

FANCIFUL OBJECT

BACKGROUND OF THE INVENTION

1. Field of the Invention

The present invention relates to fanciful, three-dimensional art objects, and more particularly to such objects which may be hollow on the inside so as to serve as a vase or container and which simulate the appearance of a particular object in realistic and yet fanciful fashion.

2. History of the Prior Art

There are a variety of different ways of forming three-dimensional art objects to be used as decorator items, as fanciful holders for various items or as vases for flowers and the like. Such objects assume many different forms and are often formed to simulate or lend the appearance of a particular object.

It is known to form fanciful objects of the type described above with a pattern of surface variations such as a scored pattern as shown for example in U.S. Pat. No. D. 17,023 of Tappan and U.S. Pat. No. D. 17,171 of Hurlbut et al. It is also known to assemble such objects from individual parts, the joints of which when assembled form lines resembling wrinkles and the like as shown for example by U.S. Pat. No. 2,606,105 of Wells in which a fanciful representation of a shoe is formed by joining together various different solid pieces.

Objects fashioned in the manner of the above-described patents, while being somewhat pleasing and artful in their appearance, are limited in the extent to which the appearance thereof may be made highly fanciful or realistic. In particular such objects tend to take on the appearance of the basic material of which they are made. For example if the object is made of a moldable material such as plastic, ceramic and the like, the finished object has the appearance of these basic materials; which in fact only imitate or emulate the original and lack a definite sense of realism. Thus, where a replica of a lady's old fashioned shoe is principally made of ceramic, it looks like a ceramic imitation of a shoe and nothing more.

On the other hand use of materials of which the original object is made in producing replicas thereof often has serious drawbacks of its own. For example, if cloth or leather which are the principal elements of a lady's old fashioned shoe are used to make a replica thereof, the result may closely simulate the original but will certainly not be capable of holding water therein and of serving as a vase or other container of substance.

In the field of artful and fanciful objects, it is also known to form such objects using one material or group of materials to form a base or superstructure for the object and a second material which covers the base, as shown for example, in U.S. Pat. No. 1,486,705 of Walker. In such objects, however, the base usually serves only as a superstructure for the object and plays little or no role in the final appearance of the object, which appearance is typically dictated by the second material which completely covers the base or superstructure.

It is known in the case of certain objects such as dolls to score a portion of the object and then apply pieces of cloth or other covering thereto. However such measures are carried out merely to improve the overall appearance of the object which itself constitutes a mere attractive object and not a vase or similar object of moldable material intended to realistically simulate an actual object like a shoe. Such objects, which are totally different in their very nature from shoe vases and similar containers are void of any suggestion as to how to make a functional object look like something it is not.

Accordingly it would be advantageous to provide a new technique for forming artful or fanciful objects which provides for useful objects such as vases having a rather unique appearance in terms of realism, fancifulness or other factors. It would furthermore be advantageous to provide such an object in which the appearance is principally that of a covering added to certain portions of the surface of a base of superstructure which predominately comprises the object. It would still furthermore be advantageous to provide such an object having seams which are very realistic and give the appearance of having been machine sewn.

SUMMARY OF THE INVENTION

Fanciful objects in accordance with the invention comprise a base made of ceramic or similar moldable material which can be worked into a desired shape when moist and thereafter allowed to dry or harden. The base is formed by causing the material to assume a shape approximating that of the fanciful object to be formed and by creating surface grooves in the base in locations where apparent seams are to appear between panels in the finished object. This procedure may be accomplished using a mold made from an original base in which the grooves have been formed. The mold facilitates fabrication of the base with the grooves in the proper locations. When the base has been hardened, pieces of a flexible covering material such as cloth are cut into the approximate shape of selected surface areas of the base defined by the grooves. The cloth pieces are bonded to the selected areas of the base in conforming fashion. The edges or margins are trimmed as necessary to insure that the margins are embedded into and terminate within the grooves. Areas of the base which are not covered with the pieces of cloth or other covering material may be colored using appropriate materials such as ceramic tints in the cases where the base is formed of ceramic.

Because the margins of the surface covering pieces terminate within the grooves in the base, the seams and surface covering material create a highly realistic impression that the object is fabricated of the material itself and not merely covered. Interesting and fanciful effects are created by this juxtaposition of unlike materials, e.g., cloth and ceramics. Alternatively, the impression of beaded seams can be created by inserting braid or beading into the grooves after the edges of the cloth covering material have been depressed into the grooves, the braid or beading being held in place with an appropriate adhesive.

DESCRIPTION OF THE DRAWINGS

The foregoing and other objects, features and advantages of the invention will be apparent from the following more particular description of a preferred embodiment of the invention, as illustrated in the accompanying drawings, in which:

FIG. 2 is an exploded perspective view of the base of FIG. 1 illustrating the manner in which the grooved base thereof is formed and the pieces of covering material added;

FIG. 4 is a sectional view of a portion of the base of FIG. 2 indicating the manner in which the pieces of covering material of FIG. 2 are bonded to the outer surface of the base;

FIG. 5 is a sectional view corresponding to that of FIG. 4 but with the pieces of covering material in place;

FIG. 6 is a sectional view of a portion of the arrangement of FIG. 2 showing the manner in which a single edge of covering material is disposed within a groove in the base;

FIG. 8 is a perspective view of a section of material showing an alternative arrangement in which braid or beading can be inserted in a groove in the base.

DETAILED DESCRIPTION

Figure 1:
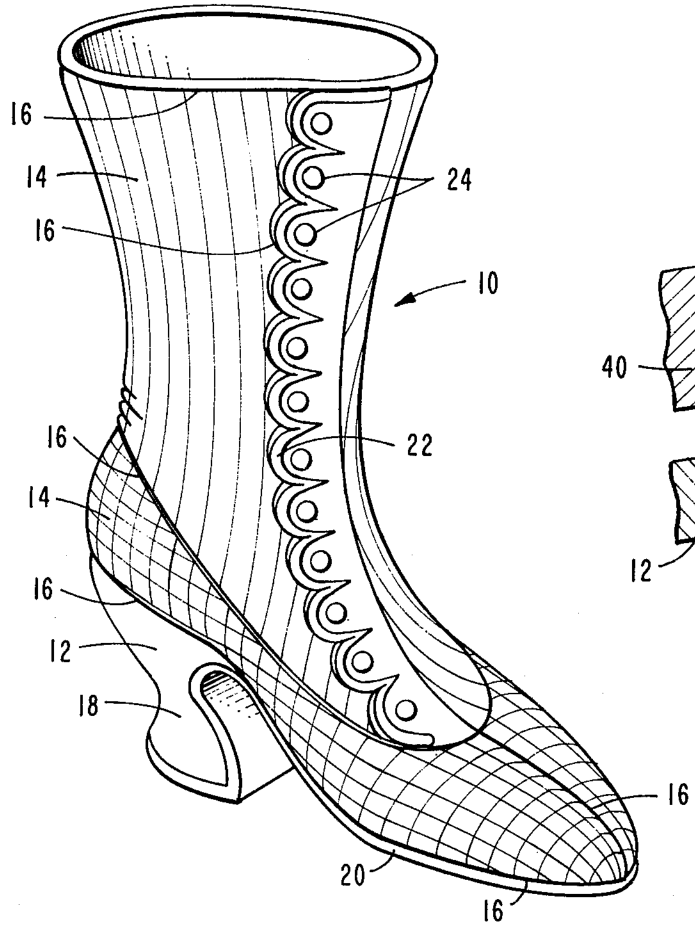
FIG. 1 is a perspective view of a vase in the form of a woman's old fashion boot or shoe in accordance with the invention.

FIG. 1 illustrates a vase 10 in the form of a woman's old fashioned shoe or boot. However it should be understood that the principles of the present invention apply to vases assuming forms other than an old fashioned shoe as well as to fanciful and artful objects other than vases. Accordingly the present invention is hereafter shown and described in terms of a vase forming an old fashioned shoe for purposes of illustration only.

The vase 10 comprises a base 12 forming the basic superstructure of the vase 10 and pieces of a covering 14 affixed to selected portions of the outer surface of the base 12 in conforming fashion. As described in detail hereafter the edges of the pieces of covering 14 are recessed into grooves formed in the outer surface of the base 12 to form a plurality of seams 16. Portions of the outer surface of the base 12 which are not covered by pieces of the covering 14 are colored by use of appropriate paints, dyes or glazes to achieve the desired artistic effect. In the case of the shoe of FIG. 1 the heel 18 and the edges 20 of the sole which are not covered by the covering 14 are painted an appropriate leather color. A scalloped area 22 in the region underlying a plurality of buttons 24 is left uncovered and is instead colored appropriately. The buttons 24 which preferably comprise real buttons and which are glued or otherwise affixed within indentations formed in the scalloped area 22 of the base 12 serve to heighten the realistic appearance of the shoe 10.

As formed in accordance with the invention the vase 10 of FIG. 1 is comprised essentially only of two materials, namely the material of the base 12 and the pieces of the covering 14. Yet the finished product has a unique and realistic appearance which stems primarily from the presence of the covering 14 and the manner in which it is secured to the base 12 to form the seams 16. As a result the seams 16 are highly realistic in appearance and resemble actual machine sewn seams in the material comprising the covering 14. Moreover the covering 14 blends with the exposed portions of the base 12 to give the vase 10 an appearance of being fabricated of the covering 14 and not the base 12.

The exploded view of FIG. 2 emphasizes the simplicity of fanciful objects in accordance with the invention despite their unique and highly realistic appearance. Specifically the vase 10 of FIG. 1 is comprised of the integrally formed base 12 and a plurality of pieces of the covering 14. In the present example five pieces of the covering 14 are employed although any number of covering pieces can be used depending upon the design of the fanciful object. As shown in FIG. 2 the three lower pieces 28, 29 and 30 of the covering 14 are affixed in conforming fashion so as to be coextensive with the outer surface of the lower or foot portion of the shoe. A pair of opposite upper pieces 32 and 34 are similar in shape and cover upper portions of the shoe in the region of the ankle and lower leg.

Figure 3:
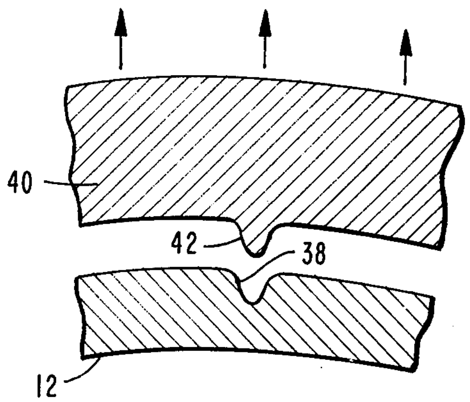
FIG. 3 is a sectional view of a portion of the base of FIG. 2 illustrating one manner in which the base is provided with surface grooves in selected locations.

The base 12 is integrally formed from moldable material which is soft and pliable and thereby easily worked when moist and which can be hardened such as by drying and made waterproof to serve as a vase or similar object. Ceramic is a preferred material for use in forming the base 12, although other appropriate materials such as plastics or plaster may be used. An original of the base 12 is first formed of the ceramic or other desired material by hand and a plurality of grooves 38 formed in the outer surface thereof. A multi-piece plaster mold 40, a small portion of which is shown in FIG. 3, is then formed from the original, the mold 40 having ridges 42 as a result of the grooves 38 in the original. Thereafter bases 12 are easily produced using the mold 40 which eliminates countless hours of hand scoring which would be necessary if the project were to be done by hand. A mixture of liquid ceramic or "slip" is poured into the mold 40 and allowed to sit for a selected period of time while the moisture from the slip is absorbed by the plaster mold and the slip begins to harden in well known fashion. When a desired thickness has been achieved, the remaining slip is poured out, the object is left to dry enough to enable removal of the mold, and the mold is removed, leaving a base in the form of a hollow shell having walls of desired thickness. As shown in FIG. 3 the ridges 42 on the inside surfaces of the mold 40 leave the grooves 38 of generally v-shaped cross-section as the mold is pulled away. Thereafter the formed base 12 is typically fired to dry and harden it, following which selected portions such as the inside surface may be glazed where desired.

The grooves 38 form the seams 16 shown in the vase 10 of FIG. 1. In some instances the grooves 38 extend along portions of the base 12 so as to receive the opposite edges of adjacent pieces of the covering 14 and thereby define the juncture between separate pieces of the covering. In other instances the grooves 38 receive the edge of a single piece of covering to define the juncture between that piece of covering and an exposed portion of the base outer surface which is to be painted or otherwise treated.

The pieces of covering 28, 29, 30, 32 and 34 comprise a flexible material which is easily secured to the outer surface of the base 12 in conforming fashion and which provides the finished vase 10 with a desired appearance. In the case of the shoe comprising the vase 10 of FIG. 1 the pieces of covering preferably comprise cloth, although other appropriate materials such as leather, plastic and vinyl can be used. Cloth is generally preferred in the embodiment of FIG. 1 since it corresponds to the material actually used in many old fashioned shoes of this type and since it has a surface texture which tends to function in conjunction with the seams formed at the grooves 38 to provide the vase 10 with an appearance which is not only highly realistic but which betrays the small amount of cloth actually used in making the vase 10. Specifically the vase 10 appears to be comprised primarily of cloth, particularly when the exposed areas of the base 12 are appropriately colored, despite the fact that the vase is principally comprised of the ceramic or similar material forming the base 12. In addition materials such as cloth provide surface patterns and designs which would otherwise be impossible to recreate except by skillful and painstaking hand painting.

Patterns are established for the covering pieces 28, 29, 30, 32 and 34 to facilitate making a number of the shoes 10 in kit-form or otherwise. By allowing the hobbyist to use his own cloth, leather or other covering material in conjunction with established patterns, a wide variety of possibilities is presented.

The base 12 is formed with a hollow interior 44 opening to the outside at the top of the shoe as shown in broken-away fashion in FIG. 2. After forming the ceramic material into the base and firing the ceramic to dry and harden it, the inside surfaces defining the hollow interior 44 are preferably glazed to provide a smooth and hard finish which protects the ceramic material against deterioration or damage and enhances the waterproof qualities of the vase in the event flowers or other items are placed in water inside the vase. The outside surfaces of the base 12, however, are not glazed so that the pieces of cloth may better adhere thereto. The portions of the outer surface of the base which are not to be covered with the pieces of cloth may be dyed or otherwise colored before application of the cloth pieces or after the pieces have been secured to the base 12, as appropriate. Where ceramic is used to form the base 12 the exposed surface portions thereof are preferably colored using tints especially intended for coloring ceramics. Paint or other coloring agents may also be used where desired.

As previously noted the pieces of covering 28, 29, 30, 32 and 34 are cut out so that the shapes thereof approximate the areas of the base 12 that are to be covered. Such pieces are also cut so that any pattern in the cloth is appropriately arranged. In the particular vase 10 of FIG. 1, for example, the cloth comprising the covering 14 has a striped and checkered pattern and the lower pieces 28, 29 and 30 are arranged so as to have the patterns thereof oriented somewhat differently from the patterns on the pieces 32 and 34.

The pieces of covering 28, 29, 30, 32 and 34 are secured to the selected surface areas of the base 12 using an appropriate bonding agent such as adhesive or glue. One preferred technique is illustrated in FIG. 4 in which a thin layer or film 46 of glue is first applied to the outer surface of the base 12, following which the pieces of covering are pressed onto the glue-moistened surfaces. In order for the edges of the pieces of covering to fit snugly within the grooves 38 it is desirable that such edges not extend beyond the grooves 38 when the pieces of covering are in place. Accordingly after the pieces of covering are seated on the appropriate surface areas of the base 12 and the edges thereof pressed into the grooves 38, the edges are peeled back and any excess is trimmed off using a pair of scissors or other appropriate tool. The edges are then inserted into the grooves where they are secured by the bonding agent. The resulting desired fit is illustrated in FIG. 5 in which the separate edges of two adjacent pieces of the covering are shown as inserted into a single groove 38 to form a seam 16. The seam 16 of FIG. 5 formed by the edges of adjacent pieces of the covering 14 is the type of seam which results when the edges of the pieces of covering 28, 29, 30, 32 and 34 are forced into common grooves. Where a seam 16 is formed by the edge of a single piece of the covering being recessed within a groove 38 such as along the sole of the shoe, above the heel of the shoe and along the scalloped area 22, the resulting seam 16 is as shown in FIG. 6. The procedure here is the same except that a single piece of the covering 14 is bonded to the base 12 and the single edge thereof is disposed within the groove 38 which has been made narrower than the other grooves.

Figure 7:
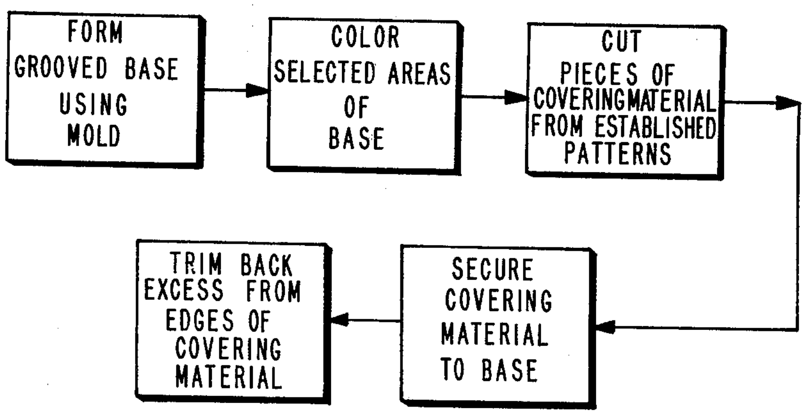
FIG. 7 is a block diagram comprising the successive steps in one preferred method of making a fanciful object in accordance with the invention.

FIG. 7 summarizes the process for making fanciful objects in accordance with the invention such as the base 10 of FIG. 1. As so illustrated the first step is to form the base of ceramic or other appropriate material as previously described. Grooves are formed at selected locations in the base where seams are to appear in the finished object. After the material forming the base has been hardened, selected treatments may be carried out such as glazing the inside surface in the case of the particular base 10 of FIG. 1. Also coloring of certain outside areas of the base which are to be exposed and not covered with the covering may alternatively be done at this point rather than later in the process. Next the individual pieces of covering are cut or otherwise formed from patterns so as to have a shape which approximates the areas of the base to be covered. Following this the individual pieces of covering are bonded to the base surfaces such as by glue or other appropriate means. Any portions of the edges of the covering pieces extending beyond the grooves are trimmed back, following which the edges are permanently secured within the grooves. If some or all of the outer surface areas of the base have not been previously colored, then that step is carried out at this point to provide the finished article.

Although not shown in FIG. 7, it may be desirable in some instances to fill the various grooves 38 with braid or beading material to provide the resulting seams 16 with a particular appearance. This technique is illustrated in FIG. 8 in which a length of beading 48 is secured partly within a groove 38 such as by an adhesive after the edges of the adjoining fabric panels have been secured within the groove 38.

It will be appreciated by those skilled in the art that fanciful objects made in accordance with the present invention provide an interesting, unique and realistic appearance using relatively simple techniques and a minimum of talent and materials. Once the grooved base has been formed it is only necessary to add pieces of covering material where appropriate and to color remaining portions of the base. Accordingly the process of making readily lends itself to the use of kits which supply a formed base, material and patterns therefor, dyes or paints, and objects such as the buttons 24 as well as instructions for assembling. The seams provide a three-dimensional or in-depth effect in terms of the appearance of the object and not only closely approximate the appearance of real seams but also cause the finished object to appear to be primarily fabricated of the covering material and not the base. An unlimited variety of prints, patterns, textures and colors of the type not ordinarily available in ceramic, plastic or plaster articles as such are made available through use of fabric or similar materials as a covering. Persons of limited artistic ability or talent can easily add the covering material to an already formed ceramic base and color the exposed portions to achieve a highly professional effect.

While the invention has been particularly shown and described with reference to a preferred embodiment thereof, it will be understood by those skilled in the art that various changes in form and details may be made therein without departing from the spirit and scope of the invention.

What is claimed is:

1. A fanciful object comprising a base of relatively hard, molded material having a selected shape and a plurality of grooves in the surface thereof and panels of flexible covering material secured to and conforming to selected portions of the surface of the base, the margins of said panels being at least partially within and along said grooves, and the panels being substantially coextensive with areas defined within said grooves and combining with exposed surface areas of the base to give the object an appearance of being substantially completely comprised of the flexible covering material of the panels rather than the molded material of the base, the base being substantially of ceramic composition and the covering material being substantially of cloth composition.

2. An object comprising a base having an outer surface which is generally curved and irregular and which has a plurality of grooves therein, a plurality of panels of flexible covering materials secured to and conforming to selected portions of the generally curved and irregular outer surface of the base, the margins of said panels being at least partially within and along said grooves, and the panels being substantially coextensive with areas defined within said grooves and combining with exposed surface areas of the base between selected ones of the grooves to give the object the appearance of being a particular fanciful object substantially completely comprised of the flexible covering material of the panels rather than the material of the base, the base enabling the object to comprise a functional object different from said fanciful object, and beading material partly disposed within at least some of the grooves.

3. A fanciful object comprising a base of relatively hard, molded material having an outer surface which is generally curved and irregular so as to simulate the outer surface of an object comprised essentially of joined pieces of thin, flexible material, the outer surface of the base having a plurality of grooves therein which intersect to define a plurality of different areas on the outer surface of the base, each of at least some of the different areas being covered with a separate piece of flexible material having a very small thickness relative to the thickness of the base and having outer edges which extend into the grooves defining the area, the base and the pieces of flexible material combining to give the fanciful object the appearance of being comprised essentially of the pieces of flexible material, and the grooves in the outer surface of the base combining with the edges of the pieces of flexible material to give the appearance that the pieces of flexible material are joined to each other at indented seams, the pieces of flexible material comprising cloth.

4. A fanciful object comprising a base of relatively hard, molded material having an outer surface which is generally curved and irregular so as to simulate the outer surface of an object comprised essentially of joined pieces of thin, flexible material, the outer surface of the base having a plurality of grooves therein which intersect to define a plurality of different areas on the outer surface of the base, each of at least some of the different areas being covered with a separate piece of flexible material having a very small thickness relative to the thickness of the base and having outer edges which extend into the grooves defining the area, the base and the pieces of flexible material combining to give the fanciful object the appearance of being comprised essentially of the pieces of flexible material, and the grooves in the outer surface of the base combining with the edges of the pieces of flexible material to give the appearance that the pieces of flexible material are joined to each other at indented seams, the pieces of flexible material comprising leather.

* * * * *